US012574564B2

(12) United States Patent
Sole Rojals et al.

(10) Patent No.: US 12,574,564 B2
(45) Date of Patent: Mar. 10, 2026

(54) BANDING ARTIFACT DETECTOR

(71) Applicant: Netflix, Inc., Los Gatos, CA (US)

(72) Inventors: Joel Sole Rojals, San Franscisco, CA (US); Mariana Fernandez Afonso, Santa Clara (PT)

(73) Assignee: Netflix, Inc., Los Gatos, CA (US)

( * ) Notice: Subject to any disclaimer, the term of this patent is extended or adjusted under 35 U.S.C. 154(b) by 317 days.

(21) Appl. No.: 18/325,983

(22) Filed: May 30, 2023

(65) Prior Publication Data

US 2023/0388556 A1    Nov. 30, 2023

Related U.S. Application Data

(60) Provisional application No. 63/347,468, filed on May 31, 2022.

(51) Int. Cl.
| | |
|---|---|
| *H04N 19/86* | (2014.01) |
| *G06F 3/14* | (2006.01) |
| *G06V 10/75* | (2022.01) |
| *G09G 3/20* | (2006.01) |

(52) U.S. Cl.
CPC .............. *H04N 19/86* (2014.11); *G06F 3/14* (2013.01); *G06V 10/751* (2022.01); *G09G 3/2044* (2013.01); *G09G 2340/0442* (2013.01)

(58) Field of Classification Search
CPC ........ G06T 5/70; G06V 10/751; H04N 19/86; G09G 3/2044; G09G 2340/0442; G06F 3/14
See application file for complete search history.

(56) References Cited

U.S. PATENT DOCUMENTS

| | | | | |
|---|---|---|---|---|
| 8,730,251 | B2 * | 5/2014 | Mathew ................ | G09G 5/395 |
| | | | | 345/545 |
| 9,432,694 | B2 * | 8/2016 | Su ........................ | H04N 19/124 |
| 11,915,391 | B2 * | 2/2024 | Bhattacharjee .......... | G06T 1/20 |
| 2019/0080437 | A1 * | 3/2019 | Shivakumar ............ | H04N 1/40 |

OTHER PUBLICATIONS

Bhagavathy, et al. (Multi-Scale Probabilistic Dithering for Suppressing Banding Artifacts in Digital Images). (Year: 2007).*
PCT/US2023/067664 International Search Report and Written Opinion mailed Sep. 12, 2023.

* cited by examiner

*Primary Examiner* — Daniel G Mariam
(74) *Attorney, Agent, or Firm* — Greenberg Traurig, LLP

(57)    ABSTRACT

A computer-implemented method includes accessing a video frame that includes a plurality of pixels. The method also includes generating a spatial mask that identifies pixels whose likelihood of causing banding within the video frame meets at least a minimum threshold likelihood. The method also includes computing a local distribution for a region of the video frame that includes at least those pixels that were identified by the spatial mask to detect bands in the video frame. The method further includes determining that the detected bands in the video frame are at least a minimum threshold size. The method also includes applying dithering to those detected bands in the video frame that were determined to meet the minimum threshold size. Various other methods, systems, and computer-readable media are also disclosed.

20 Claims, 9 Drawing Sheets

200

210 — Access video frame

220 — Generate spatial mask

230 — Compute local distribution

240 — Determine minimum size of bands

250 — Apply dithering

300

302 — Processing Architecture

301 — Input Frame

303 — Generate Spatial Mask

304 — Compute Local Distributions

305 — Dither

306 — Output Frame

701

702

800

900

BANDING ARTIFACT DETECTOR

CROSS REFERENCE TO RELATED APPLICATION

This application claims priority to and the benefit of U.S. Provisional Application No. 63/347,468, filed May 31, 2022, entitled "Banding Artifact Detector," the disclosure of which is incorporated, in its entirety, by this reference.

BACKGROUND

Internet video streaming has become commonplace across the world. Users implement electronic devices to request and view all types of videos from a variety of different streaming sources. Each of these videos is composed of long strings of video frames. Each video frame is prepared for transmission and is transmitted over the internet to the user's electronic device. As part of this preparation process, the video frames may undergo compression, encoding, decoding, and other processes. During these processes, the video frames often pick up unwanted visual artifacts. One such artifact is banding.

Banding artifacts are staircase-like contours that are often introduced during the processing of smooth, slightly varying colors or shades. The noticeability of these contours may be exacerbated during the encoding process. These artifacts are often visible in large and smooth regions, typically having small gradients from one color or shade to another. The banding artifacts are often noticeable to users, in part due to the tendency of electronic displays to enhance sharp gradients. Banding artifacts also tend to have noise in the smooth regions of the bands. This can make the detection and removal of the bands very difficult.

SUMMARY

As will be described in greater detail below, the present disclosure generally describes systems and methods for detecting and removing banding artifacts from video frames. These video frames are often included in video streams that are transmitted over the internet to electronic displays for presentation to users.

In one example, a computer-implemented method for includes accessing a video frame that includes multiple pixels, generating a spatial mask that identifies pixels whose likelihood of causing banding within the video frame meets at least a minimum threshold likelihood, computing a local distribution for a region of the video frame that includes at least the identified pixels that were identified by the spatial mask to detect bands or banding artifacts in the video frame, determining that the detected bands in the video frame are at least a minimum threshold size, and applying dithering to those detected bands in the video frame that were determined to meet the minimum threshold size.

In some embodiments, the method further includes outputting the dithered video frame to an electronic display. In some examples, the video frame is part of a video feed that is streamed to the electronic display. In some cases, generating the spatial mask includes computing a zero derivative for at least one of the pixels in the video frame.

In some embodiments, the spatial mask is generated for a block of pixels that includes at least a minimum number of adjacent pixels. In some cases, generating the spatial mask includes, for each block of pixels, determining a number of zero derivative values in the region around the block of pixels. In some examples, generating the spatial mask includes assigning the block of pixels to the spatial mask if the determined number of zero derivative values in the region is above a threshold value.

In some cases, computing the local distribution comprises identifying two or more bands within the region. In some examples, computing the local distribution includes identifying local statistics for the region around a specified block of pixels. In some cases, the local statistics for the region comprise p_values for the pixels in the block of pixels. In some examples, identifying the local statistics for the region includes identifying a largest band and a second largest band. In some embodiments, the region includes a specified size, and the size depends on a resolution of a display to which the video frame is to be sent.

In addition, a corresponding system includes at least one physical processor and physical memory that includes computer-executable instructions that, when executed by the physical processor, cause the physical processor to: access a video frame that includes multiple pixels, generate a spatial mask that identifies pixels whose likelihood of causing banding within the video frame meets at least a minimum threshold likelihood, compute a local distribution for a region of the video frame that includes at least the identified pixels that were identified by the spatial mask to detect one or more bands in the video frame, determine that the detected bands in the video frame are at least a minimum threshold size, and apply dithering to those detected bands in the video frame that were determined to meet the minimum threshold size.

In some examples, applying dithering to the detected bands in the video frame includes applying dithering to a block of pixels in the video frame. In some cases, applying dithering to the detected bands in the video frame includes creating a pseudorandom number to generate noise used in the dithering. In some embodiments, creating the pseudorandom number for noise generation includes indexing a random vector and then multiplying by a random number based on a selected pixel value. In some cases, pixel values are updated during dithering according to a calculated probability value. In some examples, the probability value is calculated as part of computing the local distribution. In some embodiments, the region is a specified size, and the size depends on a resolution of a display to which the video frame is to be sent.

In some examples, the above-described method is encoded as computer-readable instructions on a computer-readable medium. For example, in some cases, a computer-readable medium includes computer-executable instructions that, when executed by a processor of a computing device, cause the computing device to access a video frame that includes multiple pixels, generate a spatial mask that identifies pixels whose likelihood of causing banding within the video frame meets at least a minimum threshold likelihood, compute a local distribution for a region of the video frame that includes at least the identified pixels that were identified by the spatial mask to detect one or more bands in the video frame, determine that the detected bands in the video frame are at least a minimum threshold size, and apply dithering to those detected bands in the video frame that were determined to meet the minimum threshold size.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
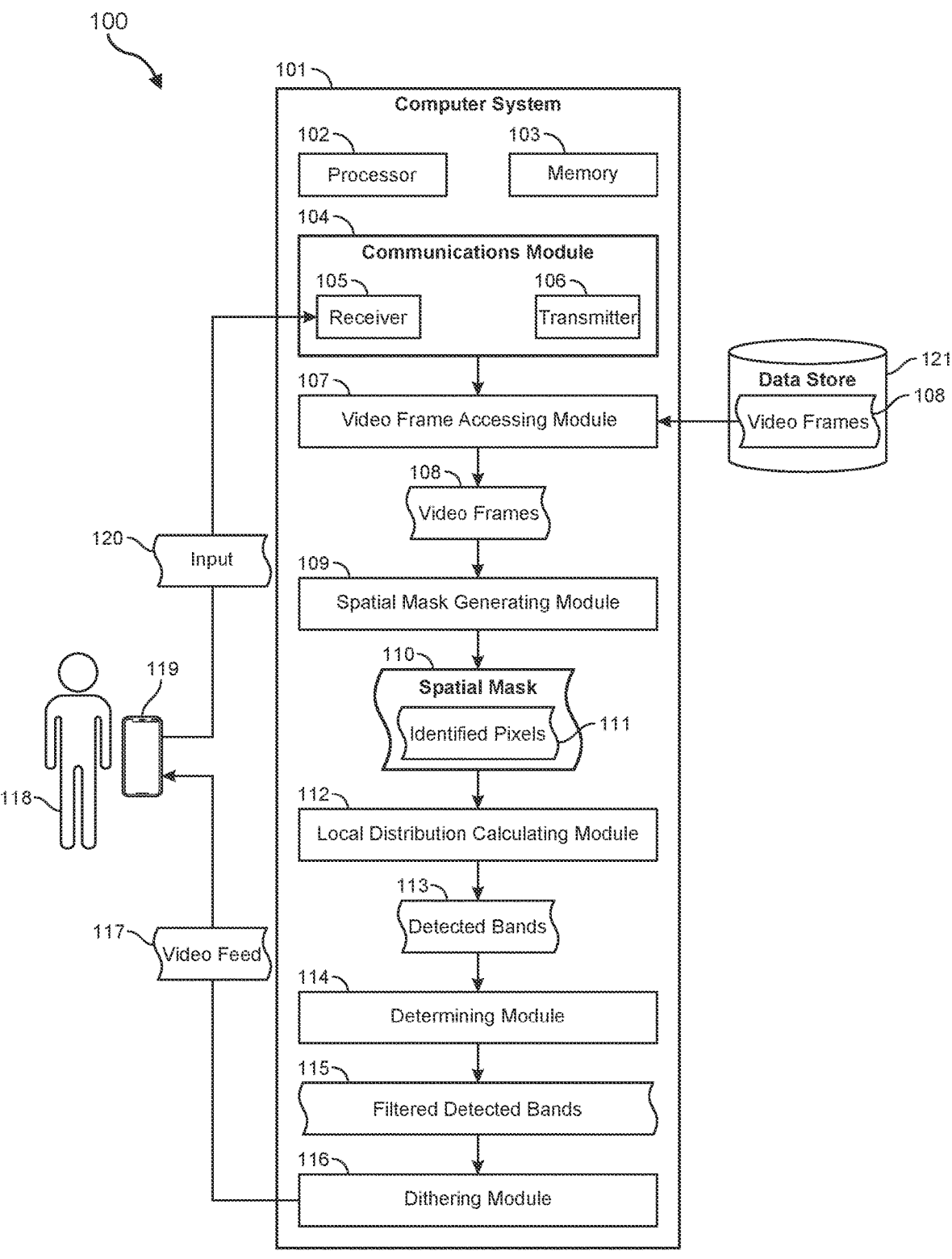
FIG. 1 illustrates an example computer architecture in which the embodiments described herein may operate.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to detecting and removing banding in video frames. Upon removing the banding, the video frames are provided to an electronic display for presentation to a user.

As noted above, some scenes in videos are more prone to artifacts than others. When videos are digitized, imperfections may be generated as part of the digitizing process. This digitizing process may include various steps that are taken when preparing videos for distribution, including compression, bit-depth reduction, and scaling to a lower resolution. Imperfections introduced during this process are often referred to as "artifacts," which may take many different forms. Each of these artifacts causes some type of unnatural appearance, and many are noticeable to users viewing the videos. The artifacts are thus distracting and tend to remove the user from an otherwise immersive experience.

Figure 7A:
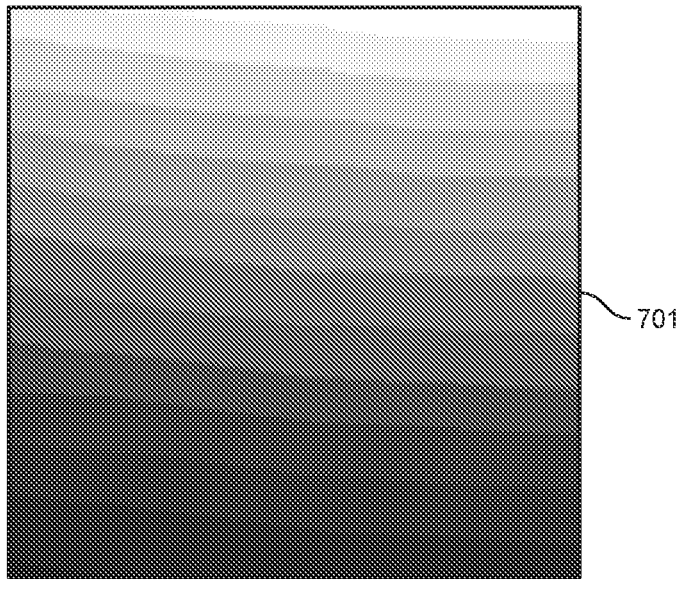
FIGS. 7A & 7B respectively illustrate before and after images in which debanding is applied.
Figure 7B:
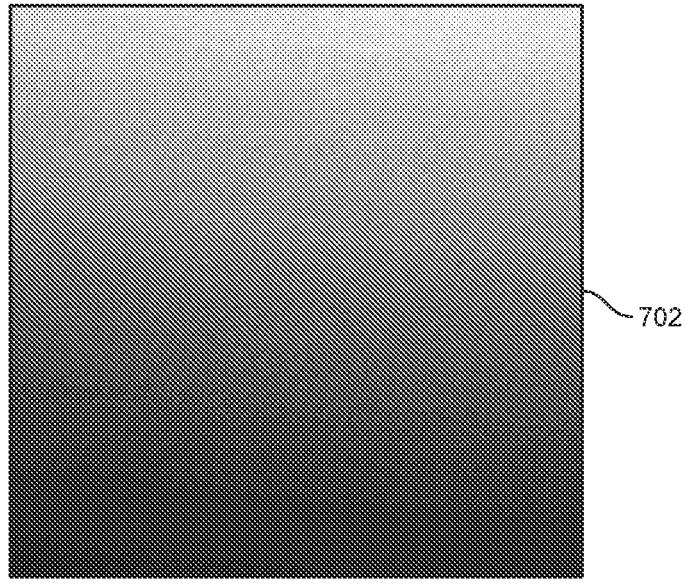

One particular type of artifact is referred to as a "banding artifact." Banding artifacts are stairstep-like contours that are introduced during the processing of certain scenes in a movie or tv show. For example, banding may occur when processing a spatially smooth, but slightly varying signal that gradually fades from one shade of grey to another or from one color to a slightly darker or lighter shade of that color (see FIG. 7A for an example of such). The banding may be made worse during the encoding process as the video is prepared for playback on an electronic device.

In some cases, banding artifacts are found along smoothly varying regions in a video frame. Such banding artifacts are often visible, for example, in scenes containing large portions of sky, sunrises and sunsets, scenes containing oceans, darkly colored scenes, and other similar types of scenes. In some settings, the electronic devices that play back the videos also contribute to the banding by maximizing contrast or sharpness. The banding artifacts are often noticeable and distracting to users. They also contain noise or other anomalies in the banded regions that make the detection and removal of the bands from the video scenes very difficult. Traditional solutions that apply a low pass filter to these regions to remove the banding do not account for the noise and do little to remove the banding artifacts from the video frames.

The embodiments herein detect and remove banding artifacts using spatial masking techniques that more accurately and precisely identify affected regions. These spatial masking techniques analyze video frames for specific pixels whose likelihood of causing banding in a given video frame meets a minimum threshold likelihood. The systems herein then compute a local distribution for those regions of the video frame that include the pixels identified by the spatial mask. Then, if the local distribution indicates that bands of at least a minimum size were detected, these systems will apply a dithering technique to smooth out the detected bands in the video frame. In this manner, the systems herein more accurately and precisely detect banding artifacts and apply a subsequent dithering process to the detected regions to remove the detected artifacts. This process will be described in greater detail below with reference to FIGS. 1-12.

FIG. 1, for example, illustrates a computing environment 100 in which banding artifacts are detected and removed. FIG. 1 includes various electronic components and elements including a computer system 101 that is used, alone or in combination with other computer systems, to perform associated tasks. The computer system 101 may be substantially any type of computer system including a local computer system or a distributed (e.g., cloud) computer system. The computer system 101 includes at least one processor 102 and at least some system memory 103. The computer system 101 includes program modules for performing a variety of different functions. The program modules may be hardware-based, software-based, or may include a combination of hardware and software. Each program module uses computing hardware and/or software to perform specified functions, including those described herein below.

In some cases, the communications module 104 is configured to communicate with other computer systems. The communications module 104 includes substantially any wired or wireless communication means that can receive and/or transmit data to or from other computer systems.

These communication means include, for example, hardware radios such as a hardware-based receiver 105, a hardware-based transmitter 106, or a combined hardware-based transceiver capable of both receiving and transmitting data. The radios may be WIFI radios, cellular radios, Bluetooth radios, global positioning system (GPS) radios, or other types of radios. The communications module 104 is configured to interact with databases, mobile computing devices (such as mobile phones or tablets), embedded computing systems, or other types of computing systems.

The computer system 101 further includes a video frame accessing module 107. The video frame accessing module 107 is configured to access video frames 108. The video frames 108 are stored in a data store 121. The data store 121 may be local to the computer system 101 or remote. In some cases, the data store 121 is a distributed data store or cloud-based data store. The video frames 108 represent frames of a movie, tv show, internet video, or other portion of video content. The video frame accessing module 107 typically accesses sequences of video frames, although in some cases, the video frames 108 are single frames.

The video frame accessing module 107 provides the video frames 108 to the spatial mask generating module 109. The spatial mask generating module 109 generates a spatial mask 110 (or accesses a previously generated spatial mask). As the term is used herein, a "spatial mask" refers to a process or operation that identifies pixels 111 that are likely to contribute to banding while discarding other pixels for subsequent steps. The spatial mask 110 thus keeps the identified pixels and removes the remaining pixels. The calculation or computation of a spatial mask detects flatness in a given pixel or block. In at least some cases, the calculation includes determining, for each pixel, whether the pixel has zero derivatives. A given pixel has zero derivatives when that pixel's value is the same as the pixel on the right and the pixel below. The process of calculating a spatial mask will be described in greater detail below with regard to FIGS. 3-9.

Once the spatial mask generating module 109 has generated the spatial mask 110 and identified certain pixels 111 as being likely to contribute to banding (or likely to be part of a banding artifact), the local distribution calculating module 112 calculates a local distribution among the identified pixels 111 to refine the detection of banding artifacts and determine a dither noise probability distribution. Such a local distribution, as will be explained further below, gathers statistics around each pixel or block of pixels identified by the spatial mask. These statistics include ranges of pixel values around the current pixel for or around which banding is being detected.

The determining module 114 then determines whether the detected bands 113 are sufficiently large, so as not to apply dithering to small details that are to be kept within the frame. The filtered, detected bands 115 (or identifiers for these bands) are then sent to the dithering module 116. The dithering module 116 then applies dithering according to a pseudorandom noise generator to appropriately smooth out the identified bands. The dithered video feed 117 is then sent to one or more users 118 and/or their associated electronic devices 119. This process will be described in greater detail with respect to method 200 of FIG. 2 and FIGS. 1-9 below.

Figures 2, 3:
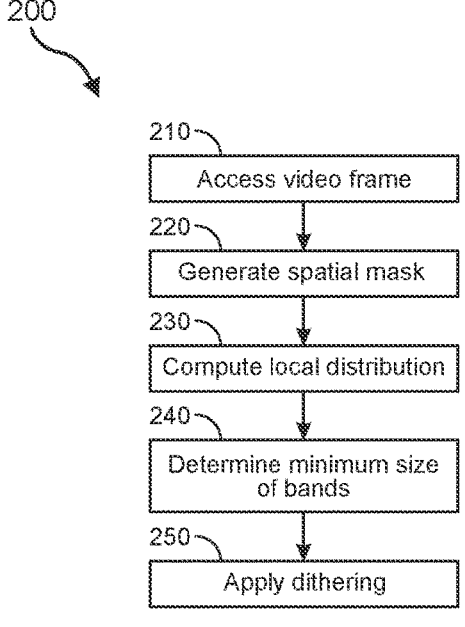
FIG. 2 illustrates a flow diagram of an exemplary method for detecting and removing banding in video frames.
FIG. 3 illustrates an alternative example computer architecture in which the embodiments described herein may operate.

FIG. 2 is a flow diagram of an exemplary computer-implemented method 200 for detecting and removing banding in video frames. The steps shown in FIG. 2 may be performed by any suitable computer-executable code and/or computing system, including the systems illustrated in FIG. 1. In one example, each of the steps shown in FIG. 2 may represent an algorithm whose structure includes and/or is represented by multiple sub-steps, examples of which will be provided in greater detail below.

Method 200 includes, at 210, a step for accessing a video frame 108 that includes multiple different pixels. At step 220, method 200 includes generating a spatial mask 110 that identifies one or more pixels 111 whose likelihood of causing banding within the video frame meets at least a minimum threshold likelihood. At step 230, method 200 includes computing a local distribution for a region of the video frame that includes at least the identified pixels that were identified by the spatial mask to detect one or more bands 113 in the video frame 108. At step 240, method 200 then includes determining that the detected bands 113 in the video frame are at least a minimum threshold size and, at step 250, method 200 includes applying dithering to those detected bands in the video frame that were determined to meet the minimum threshold size.

Optionally, the dithered video frame is then provided to an electronic device 119. In some cases, the video frame is part of a dithered video feed 117 that is streamed to the electronic display. Still further, at least in some cases, the user 118 may alter settings related to artifact detection, including changing settings related to banding artifact detection and removal, via input 120. In some implementations, the dithered video frames are additionally sent to the data store 121 and/or to other computer systems or storage systems.

FIG. 3 illustrates an example embodiment 300 of a processing architecture 302. The processing architecture 302 includes a module 303 to generate a spatial mask, a module 304 to compute local distributions, and a module 305 to perform dithering. Input frames 301 are provided to the processing architecture 302 and, upon being processed by some or all of the modules 303-305, the processing architecture produces output frames 306. In some embodiments, additional pre-processing steps may be performed, as shown in FIG. 4.

Figure 4:
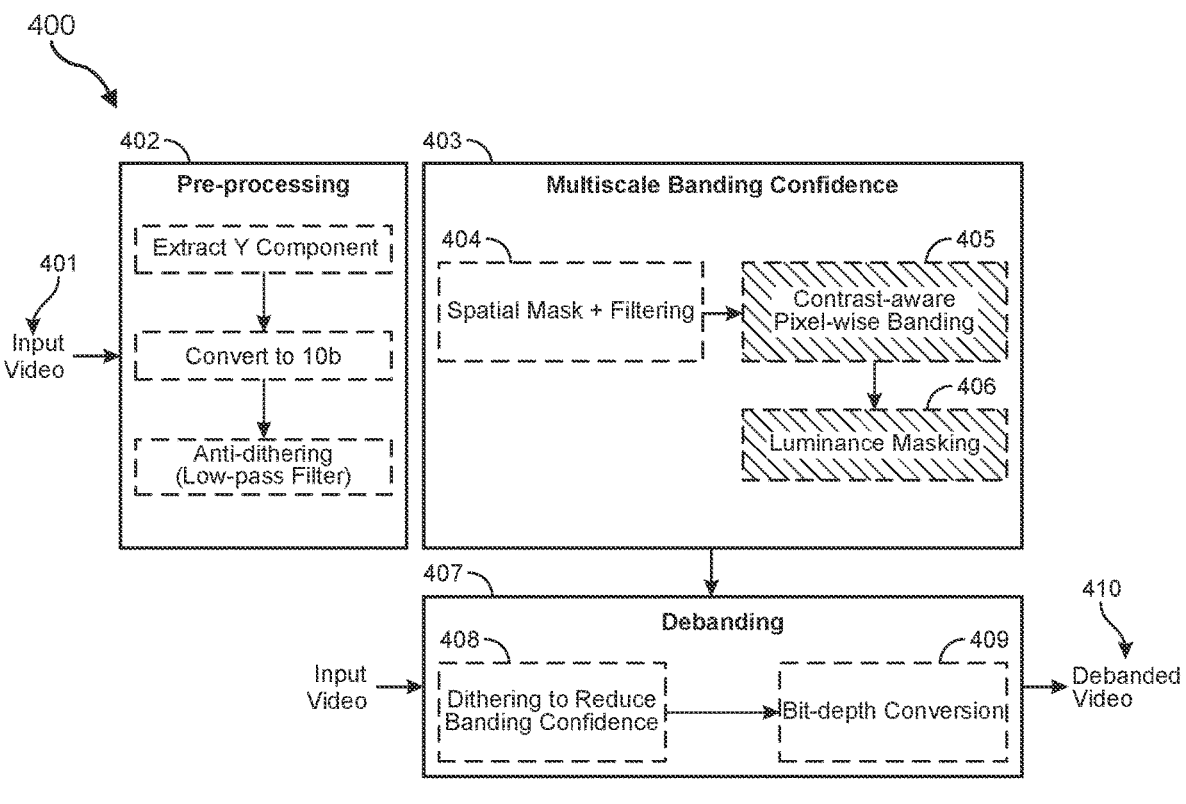
FIG. 4 illustrates an embodiment in which an input video is pre-processed and debanded according to embodiments described herein.

For example, in embodiment 400 of FIG. 4, a pre-processing module 402 performs different tasks on the input video 401 before band detection and debanding are performed in modules 403 and 407, respectively. In this example, the pre-processing module 402 receives the input video 401 and extracts luma (Y) components for some or all of the pixel values in the input video. When necessary, the luma components are then converted to 8-bit or 10-bit components. The pre-processing module 402 may also apply an anti-dithering low-pass filter to some or all of the pixel values in the input video 401.

The multiscale banding confidence module 403 then generates a spatial mask at 404 and optionally performs some filtering to reduce the number of pixels that are analyzed at subsequent steps. At least in some cases, the multiscale banding confidence module 403 performs one or more iterations of contrast-aware pixel-wise band detection at 405 and luminescence masking at 406. The debanding module 407 can then perform dithering at 408 and bit-depth conversion at 409 to provide a debanded output video 410 for presentation on an electronic display (e.g., 119 of FIG. 1).

Figure 5A:
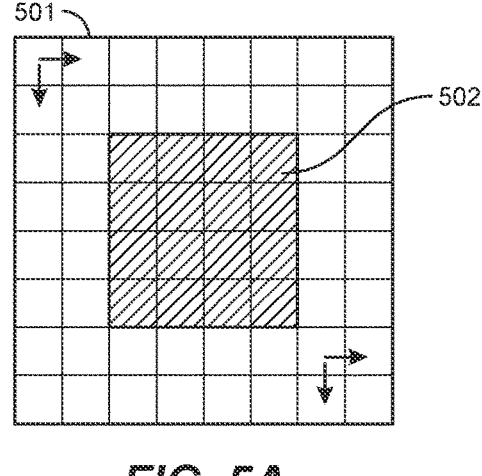
FIG. 5A illustrates an embodiment including a block of pixels that is to be analyzed for banding.
Figure 5B:
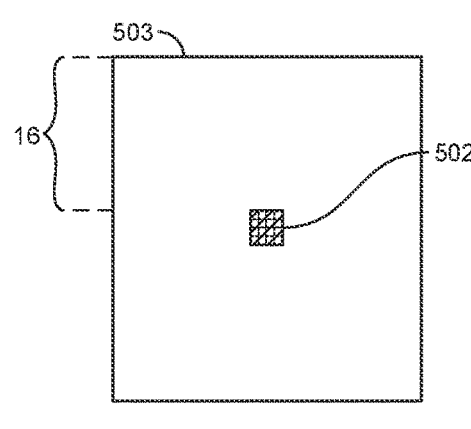
FIG. 5B illustrates an embodiment in which a region surrounding a block is identified and used in various embodiments herein.

FIGS. 5A and 5B illustrate examples of this process. In some embodiments, a spatial mask is generated for a block of pixels. In some cases, the block of pixels is a specified size, such as the 4×4 block of pixels 502 shown in FIG. 5A. In some cases, a spatial mask policy may be in place that specifies at least a minimum number of adjacent pixels that are to be used when generating the spatial mask 404. As noted above, at least in some embodiments, generating the spatial mask includes computing a zero derivative for at least one of the other pixels in the video frame. In some examples, this includes computing a zero derivative for the pixel on the right of an identified pixel and computing a zero derivative for the pixel below the identified pixel. In such embodiments, the identified pixel will have zero derivatives when its value is the same as the pixel to its right and the pixel beneath. Additionally or alternatively, zero derivatives may be calculated for other pixels surrounding the current pixel.

In some embodiments, the systems herein count the number of pixels with zero derivatives in an 8×8 (or other size) window 501 around the 4×4 (or other size) block of pixels 502. These systems then assign the 4×4 block to the spatial mask if the count is larger than a threshold value. In some cases, this threshold value depends on the frame resolution of the input video frame (e.g., 401). Thus, the threshold value is higher for ultra-high definition (UHD) resolution and above, with lower resolution frames having a lower threshold value.

In some cases, generating a spatial mask for a video frame includes, for each block of pixels 502, determining the number of zero derivative values in the region around the block of pixels (e.g., window 501, or within a larger window 503, as shown in FIG. 5B). Generating the spatial mask also includes assigning the block of pixels 502 to the spatial mask 404 if the determined number of zero derivative values in the region is above a threshold value. Thus, because the spatial mask indicates the likelihood that given pixels include banding artifacts, if the number of zero derivatives in the window 501 is large enough (i.e., at or beyond the specified threshold value), that block is determined to be likely to have banding and is thus assigned to the spatial mask.

After a spatial mask has been generated indicating which pixels or which blocks of pixels are likely to have banding artifacts, the systems herein compute a local distribution that identifies banding within the pixels or blocks identified by the spatial mask. In some cases, this involves identifying two or more bands within a given region (e.g., window 503). In some embodiments, computing the local distribution includes identifying local statistics for the region around a specific block of pixels (e.g., window 503). In some cases, the window size is a parameter that is set to a specific value by default. In at least some embodiments, the window size is adjustable according to the width and height or resolution of the video frame. The local statistics may include p_values for the pixels in the block of pixels. The p_values refer to the number of pixels in the window with a value equal to a pixel_value+a value (d). The information gathered to perform the subsequent dithering step is the number of pixels in the window with a value equal to each entry in the range [pixel_value−max_diff, pixel_value+max_diff]. As such, the p_values p(d) for d=−max_diff . . . max_diff around each 4×4 block are collected for use in dithering.

Figure 6:
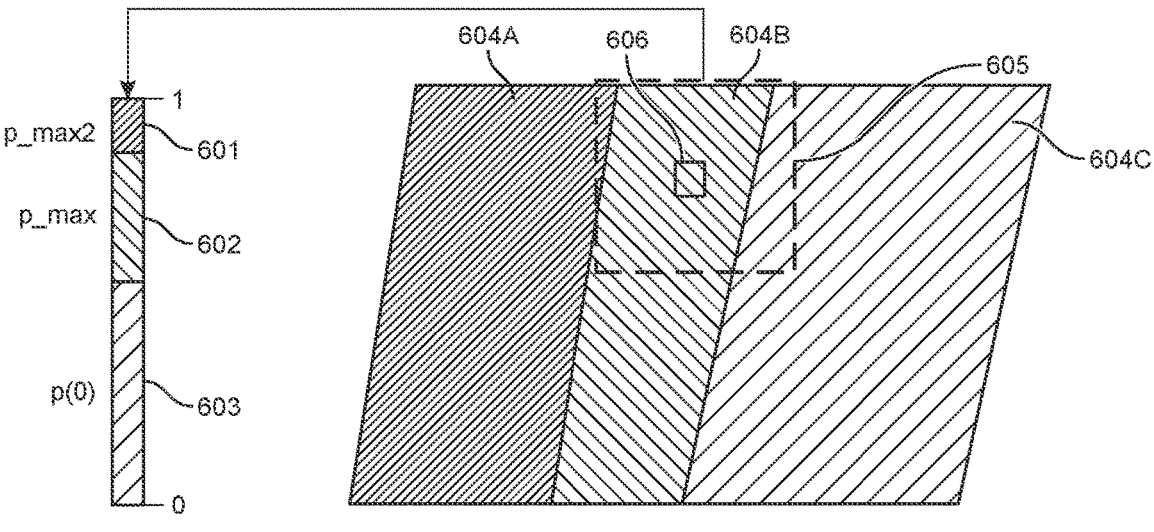
FIG. 6 illustrates an embodiment in which a banding window is implemented to identify banding in video frames.

In some cases, identifying the local statistics for the region includes identifying the band of the current pixel and the largest and the second largest bands, and then applying dithering to the detected bands in the video frame. Alternatively, the systems herein may consider each of the bands between −max_diff and +max_diff, regardless of the size. Dithering is then applied to one or more of the pixels in the video frame, as shown in FIG. 6. The dithering is applied by creating a pseudorandom number to generate noise used in the dithering. A dithering probability distribution is thus generated using the size of the band to which the pixel belongs and the two other largest bands in the window.

As shown in FIG. 6, a region 605 may cover three (or more) separate bands between shades 604A, 604B, and 604C. The identified block of pixels 606 lies in color shade 604B. When selecting a pseudorandom value for dithering along the bands between shades 604A and 604C, the system determines a p(0) value 603 indicating the number of pixels in the window with a value equal to the current pixel value, while the p_max 602 and p_max2 601 values indicate the largest and second largest bands in the window. This process ensures that the pseudorandom values selected will be the best-suited values to create a seamless visual transition between color shades, thereby removing (or at least reducing the effects of) the banding artifacts. This is shown in the contrast between image 701 of FIG. 7A, which shows multiple banding artifacts and image 702 of FIG. 7B in which banding has been reduced or largely removed. In at least some embodiments, a higher number of bands are analyzed to provide a more seamless visual transition.

In some cases, creating the pseudorandom number for dithering (or, more specifically, as part of noise generation for the dithering) includes indexing a random vector and multiplying by a random number based on a selected pixel value. This process of selecting and indexing a random vector and then multiplying by a random number that is generated from a specific pixel value, pixel histogram, and/or pixel location, provides a random number that is tied to an initial pixel value. In this manner, the noise value that is ultimately derived and used in dithering will be randomly generated and will be based on the pixel location and pixel values of pixels in the window (e.g., a pixel that is within the region 605). The calculated probability value (e.g., 603) is then used to dither by updating the pixel values. In some cases, the probability value is calculated as part of computing the local distribution (e.g., 304 of FIG. 3).

Additionally or alternatively, the pseudorandom value used for dithering may be generated according to the statistics gathered as part of computing the local distribution. In one embodiment, the pseudorandom value is generated using p_values for a 4×4 block and the column and row of the pixel. In such cases, the pseudorandom value may be equal to (the pixel's column identifier*the pixel's row identifier*a hard-coded randomly generated vector with 64 6-bit entries*the p_values for the 4×4 block). This pseudorandom value is then used to provide noise that breaks down the appearance of any bands that may be present in the identified region.

Figure 8:
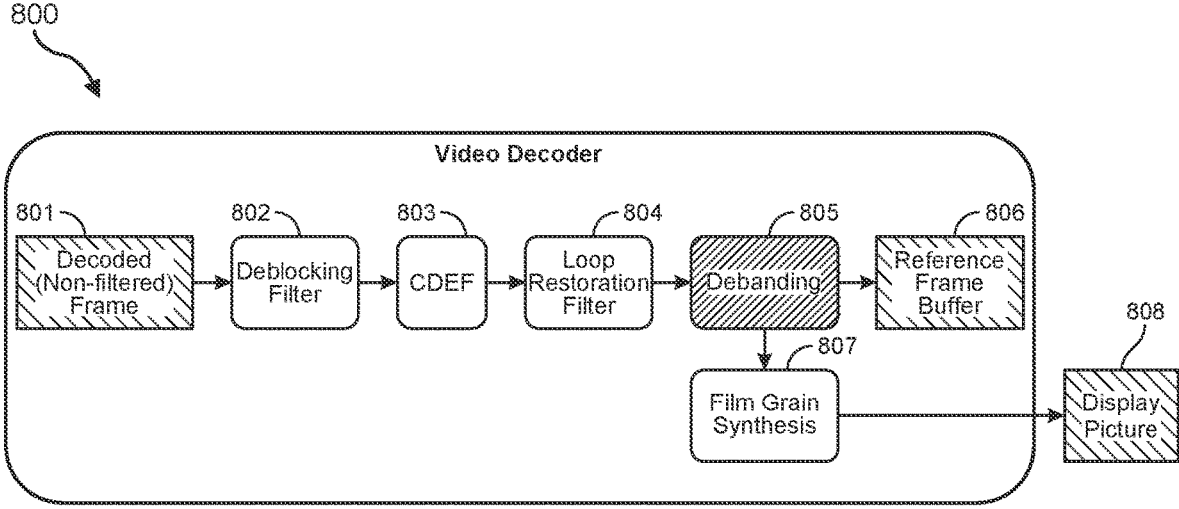
FIG. 8 illustrates an embodiment in which a debanding algorithm is implemented as part of a decoding process.
Figure 9:
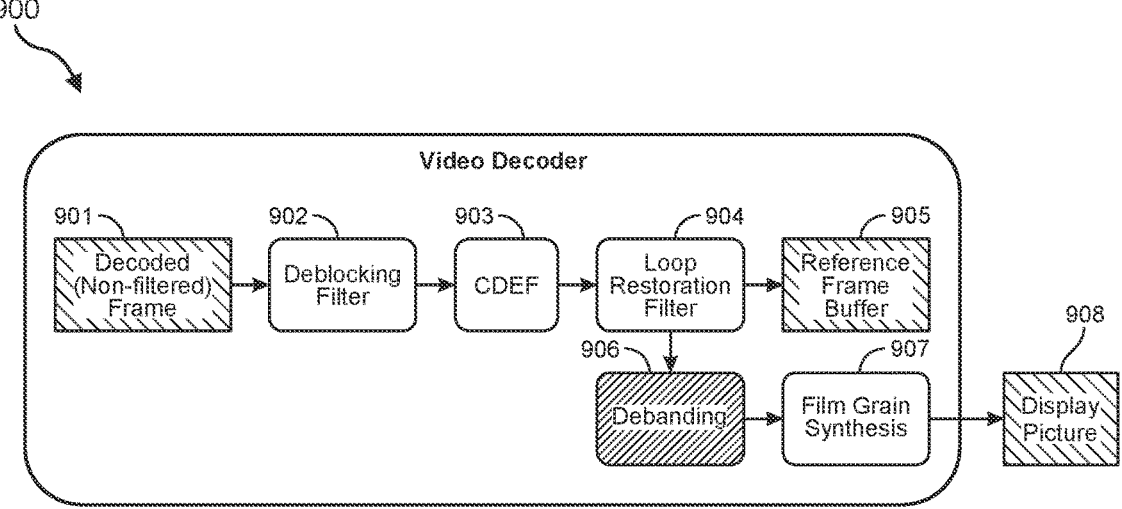
FIG. 9 illustrates an alternative embodiment in which a debanding algorithm is implemented as part of a decoding process.

FIGS. 8 and 9 illustrate embodiments of a debanding process that is part of an in-loop filter (e.g., in a video coding format such as AOMedia Video 2 (AV2)) (FIG. 8) or is part of a post-loop filter (FIG. 9). In embodiment 800 of FIG. 8, a video decoder may include various modules that process a video frame. For instance, a decoded frame 801 is provided to a deblocking filter 802 that performs deblocking to the frame. The frame is then passed to the Constrained Directional Enhancement Filter (CDEF) 803 that reduces ringing and other artifacts. The frame is then passed to the loop restoration filter 804 and on to debanding 805. The debanding process (e.g., as outlined in FIGS. 2 and 3) may result in a reference frame buffer 806 and a debanded output that is provided to the film grain synthesis module 807, which adds a film grain to the video frame, making the frame appear as though it were shot on celluloid film. The video frame is then ready for display at 808.

In at least some of the embodiments described herein, specific syntax and semantics may be used in debanding filter bitstream elements. Video standards specify the video decoding process, which provides, among others, a description of what is signaled in the bitstream (the syntax elements) and its meaning (their semantics). These syntax elements and associated semantics may be customized for the inclusion in the embodiments herein.

For instance, the debanding filter (in loop or post loop) described above may be included in the decoder in multiple different ways. In some cases, debanding is applied at different levels (e.g., at the block or at the frame). In other cases, the semantics of the debanding system's signaling in the bitstream differ. For instance, in some embodiments, debanding is always applied. In other cases, debanding is applied on specific frames according to the signaling. In still other cases, debanding is applied to sub-frame blocks (CTU, LRU, . . . ) according to the signaling.

In some cases, a flag is added at sequence and frame levels to indicate the usage of the debanding systems described herein. Knobs providing a fine level of granularity may be provided to allow tuning of the debanding filter, including tuning the filter's strength, complexity, and/or location in the decoding process. Some example syntax elements include an input_window_size to adjust the dithering window extension and the computational complexity, a max_log_contrast to define the maximum difference in amplitude between bands onto which dithering is to be applied, and mask_threshold_parameter to control how strict the condition is in the spatial mask that determines what a band-prone area is. Each of these syntax elements is configurable and is usable to indicate how the debanding system is being used in a given implementation.

FIG. 9 illustrates a debanding process that is part of a post-loop filter. In this embodiment 900, a decoded frame 901 is provided to a deblocking filter 902 for deblocking and to a CDEF 903 that reduces various artifacts. The loop restoration filter 904 then provides the video frame for the debanding process 906 after generating a reference frame buffer 905. The debanding process 906 identifies and removes (or reduces) banding artifacts and provides the frame to the film grain synthesis module 907 to add the film grain appearance to the frame by adding contrast and potentially making other changes to make the video more film-like. The video frame is then provided to the display 908. As such, the debanding process described herein may operate in many different stages of the encoding/decoding process and may flexibly be applied as part of an in-loop filter or as a part of a post-loop filter. The noise applied during dithering may truly be a pseudorandom value that provides a proper and gradual change from one color shading to another, thereby removing any banding artifacts that are present in a video frame.

A system corresponding to the above-described method is also provided herein. The system includes at least one physical processor and physical memory including computer-executable instructions that, when executed by the physical processor, cause the physical processor to: access a video frame that includes a plurality of pixels, generate a spatial mask that identifies one or more pixels whose likelihood of causing banding within the video frame meets at least a minimum threshold likelihood, compute a local distribution for a region of the video frame that includes at least the identified pixels that were identified by the spatial mask to detect one or more bands in the video frame, determine that the detected bands in the video frame are at least a minimum threshold size, and apply dithering to those detected bands in the video frame that were determined to meet the minimum threshold size.

A corresponding non-transitory computer-readable medium is also provided. The non-transitory computer-readable medium includes one or more computer-executable instructions that, when executed by at least one processor of a computing device, cause the computing device to: access a video frame that includes a plurality of pixels, generate a spatial mask that identifies one or more pixels whose likelihood of causing banding within the video frame meets at least a minimum threshold likelihood, compute a local distribution for a region of the video frame that includes at least the identified pixels that were identified by the spatial mask to detect one or more bands in the video frame, determine that the detected bands in the video frame are at least a minimum threshold size, and apply dithering to those detected bands in the video frame that were determined to meet the minimum threshold size.

Figure 10:
FIG. 10 is a block diagram of an exemplary content distribution ecosystem.
Figure 10:
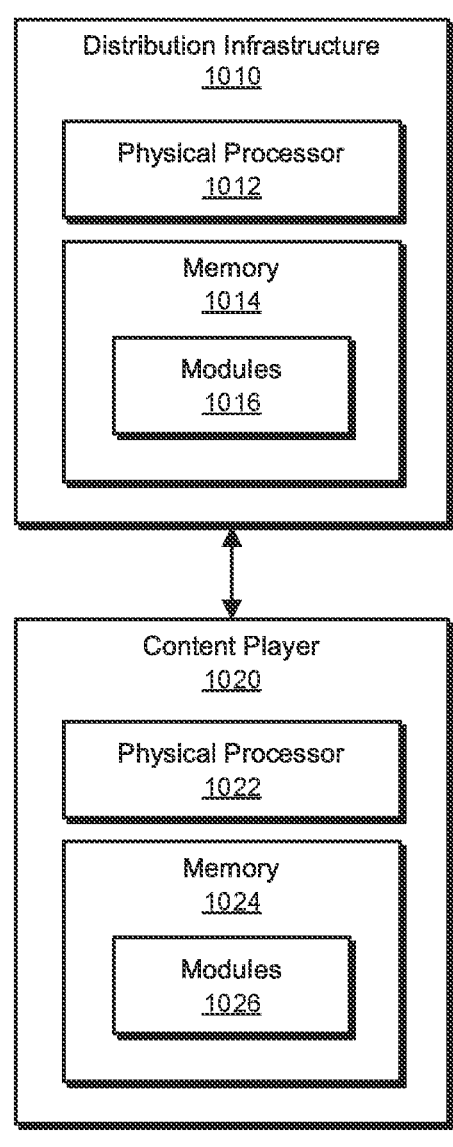
Figure 11:
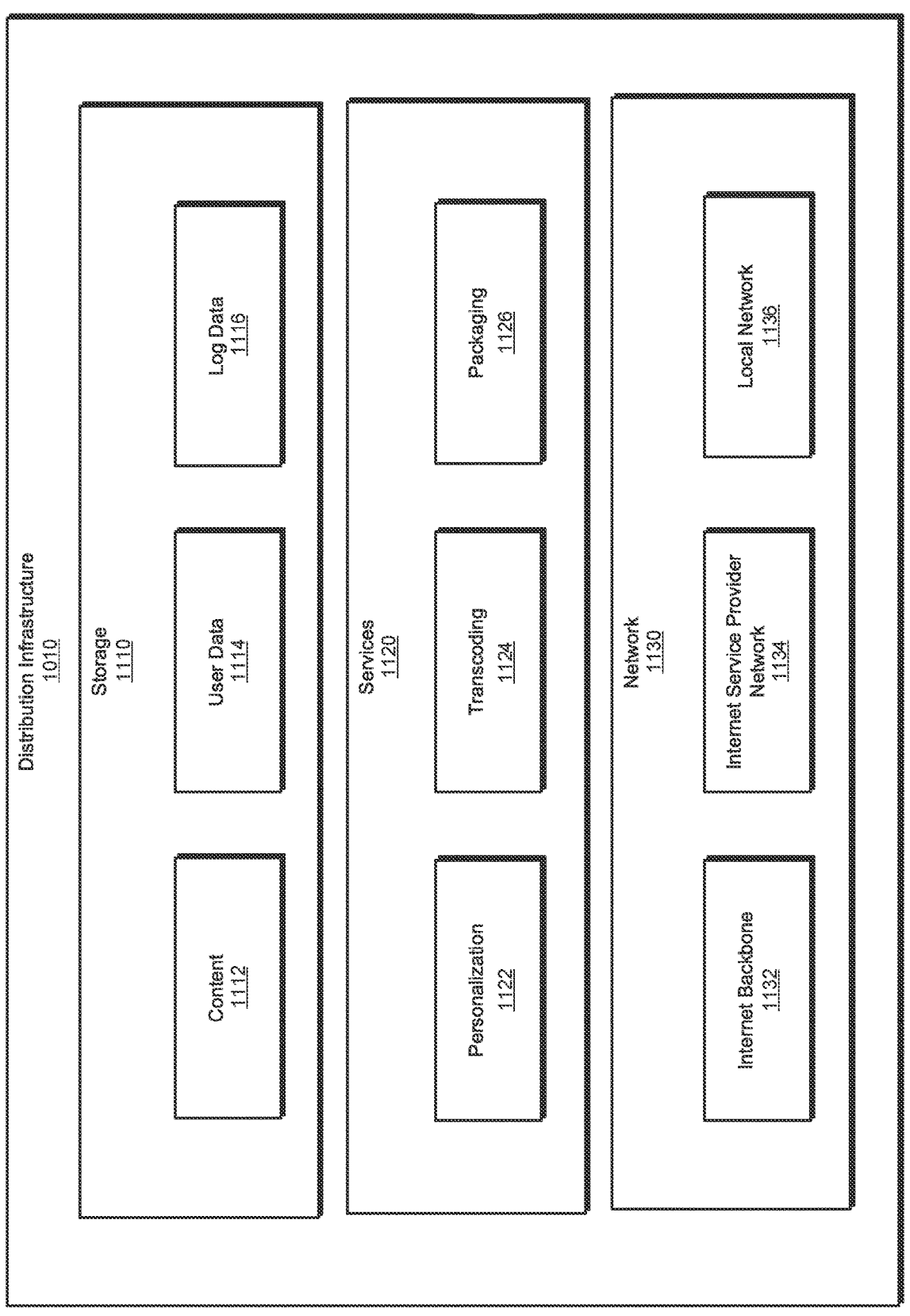
FIG. 11 is a block diagram of an exemplary distribution infrastructure within the content distribution ecosystem shown in FIG. 10.
Figure 12:
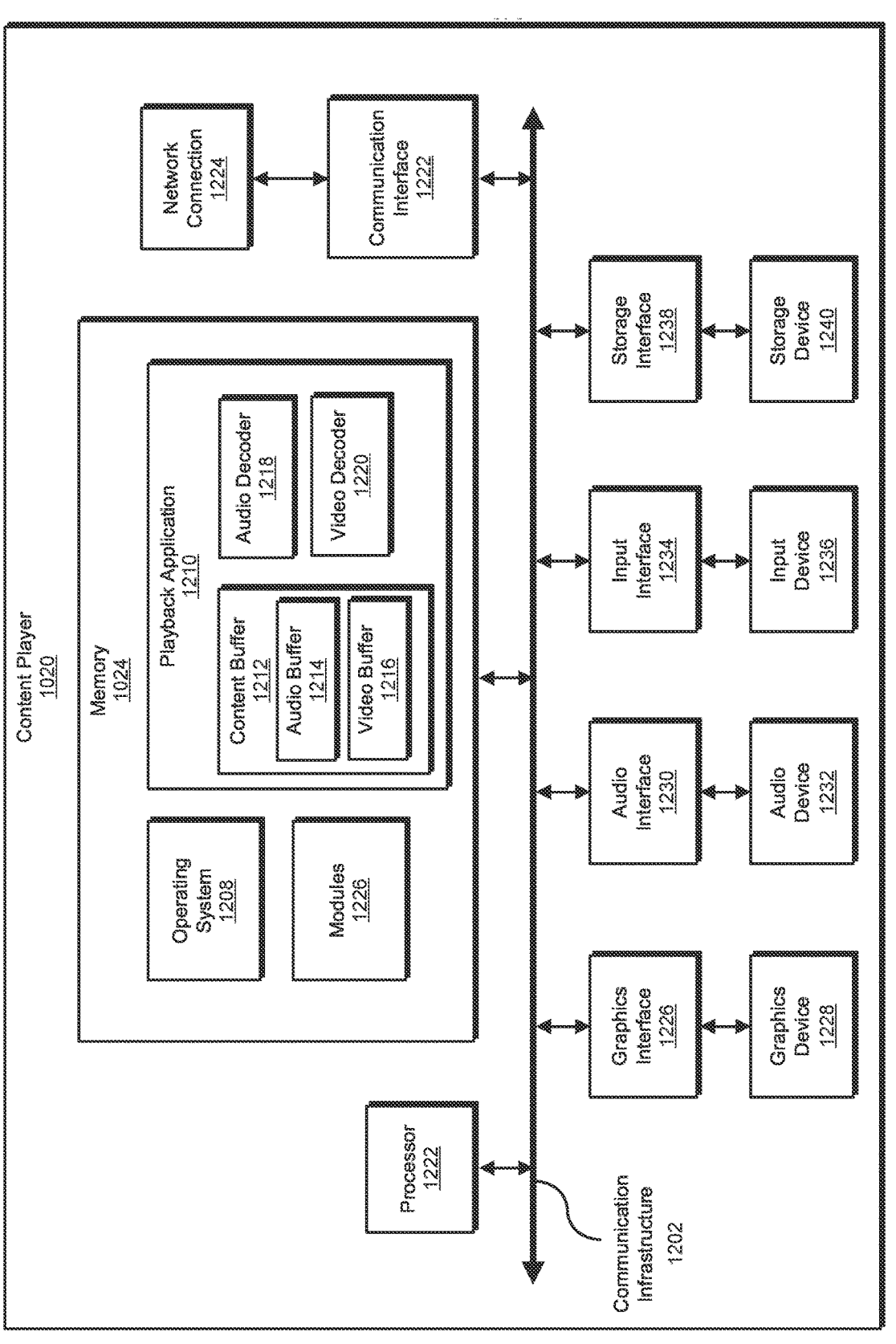
FIG. 12 is a block diagram of an exemplary content player within the content distribution ecosystem shown in FIG. 11.

The following will provide, with reference to FIG. 10, detailed descriptions of exemplary ecosystems in which content is provisioned to end nodes and in which requests for content are steered to specific end nodes. The discussion corresponding to FIGS. 11 and 12 presents an overview of an exemplary distribution infrastructure and an exemplary content player used during playback sessions, respectively. These exemplary ecosystems and distribution infrastructures are implemented in any of the embodiments described above with reference to FIGS. 1-16.

FIG. 10 is a block diagram of a content distribution ecosystem 1000 that includes a distribution infrastructure 1010 in communication with a content player 1020. In some embodiments, distribution infrastructure 1010 is configured to encode data at a specific data rate and to transfer the encoded data to content player 1020. Content player 1020 is configured to receive the encoded data via distribution infrastructure 1010 and to decode the data for playback to a user. The data provided by distribution infrastructure 1010 includes, for example, audio, video, text, images, animations, interactive content, haptic data, virtual or augmented reality data, location data, gaming data, or any other type of data that is provided via streaming.

Distribution infrastructure 1010 generally represents any services, hardware, software, or other infrastructure components configured to deliver content to end users. For example, distribution infrastructure 1010 includes content aggregation systems, media transcoding and packaging services, network components, and/or a variety of other types of hardware and software. In some cases, distribution infrastructure 1010 is implemented as a highly complex distribution system, a single media server or device, or anything in between. In some examples, regardless of size or complexity, distribution infrastructure 1010 includes at least one physical processor 1012 and at least one memory device 1014. One or more modules 1016 are stored or loaded into memory 1014 to enable adaptive streaming, as discussed herein.

Content player 1020 generally represents any type or form of device or system capable of playing audio and/or video content that has been provided over distribution infrastructure 1010. Examples of content player 1020 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 1010, content player 1020 includes a physical processor 1022, memory 1024, and one or more modules 1026. Some or all of the adaptive streaming processes described herein is performed or enabled by modules 1026, and in some examples, modules 1016 of distribution infrastructure 1010 coordinate with modules 1026 of content player 1020 to provide adaptive streaming of digital content.

In certain embodiments, one or more of modules 1016 and/or 1026 in FIG. 10 represent one or more software applications or programs that, when executed by a computing device, cause the computing device to perform one or more tasks. For example, and as will be described in greater detail below, one or more of modules 1016 and 1026 represent modules stored and configured to run on one or more general-purpose computing devices. One or more of modules 1016 and 1026 in FIG. 10 also represent all or portions of one or more special-purpose computers configured to perform one or more tasks.

In addition, one or more of the modules, processes, algorithms, or steps described herein transform data, physical devices, and/or representations of physical devices from one form to another. For example, one or more of the modules recited herein receive audio data to be encoded, transform the audio data by encoding it, output a result of the encoding for use in an adaptive audio bit-rate system, transmit the result of the transformation to a content player, and render the transformed data to an end user for consumption. Additionally or alternatively, one or more of the modules recited herein transform a processor, volatile memory, non-volatile memory, and/or any other portion of a physical computing device from one form to another by executing on the computing device, storing data on the computing device, and/or otherwise interacting with the computing device.

Physical processors 1012 and 1022 generally represent any type or form of hardware-implemented processing unit capable of interpreting and/or executing computer-readable instructions. In one example, physical processors 1012 and 1022 access and/or modify one or more of modules 1016 and 1026, respectively. Additionally or alternatively, physical processors 1012 and 1022 execute one or more of modules 1016 and 1026 to facilitate adaptive streaming of digital content. Examples of physical processors 1012 and 1022 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 1014 and 1024 generally represent any type or form of volatile or non-volatile storage device or medium capable of storing data and/or computer-readable instructions. In one example, memory 1014 and/or 1024 stores, loads, and/or maintains one or more of modules 1016 and 1026. Examples of memory 1014 and/or 1024 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

FIG. 11 is a block diagram of exemplary components of content distribution infrastructure 1010 according to certain embodiments. Distribution infrastructure 1010 includes storage 1110, services 1120, and a network 1130. Storage 1110 generally represents any device, set of devices, and/or systems capable of storing content for delivery to end users. Storage 1110 includes a central repository with devices capable of storing terabytes or petabytes of data and/or includes distributed storage systems (e.g., appliances that mirror or cache content at Internet interconnect locations to provide faster access to the mirrored content within certain regions). Storage 1110 is also configured in any other suitable manner.

As shown, storage 1110 may store a variety of different items including content 1112, user data 1114, and/or log data 1116. Content 1112 includes television shows, movies, video games, user-generated content, and/or any other suitable type or form of content. User data 1114 includes personally identifiable information (PII), payment information, preference settings, language and accessibility settings, and/or any other information associated with a particular user or content player. Log data 1116 includes viewing history information, network throughput information, and/or any other metrics associated with a user's connection to or interactions with distribution infrastructure 1010.

Services 1120 includes personalization services 1122, transcoding services 1124, and/or packaging services 1126. Personalization services 1122 personalize recommendations, content streams, and/or other aspects of a user's experience with distribution infrastructure 1010. Encoding services 1124 compress media at different bitrates which, as described in greater detail below, enable real-time switching between different encodings. Packaging services 1126 package encoded video before deploying it to a delivery network, such as network 1130, for streaming.

Network 1130 generally represents any medium or architecture capable of facilitating communication or data transfer. Network 1130 facilitates communication or data transfer using wireless and/or wired connections. Examples of network 1130 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 11, network 1130 includes an Internet backbone 1132, an internet service provider 1134, and/or a local network 1136. As discussed in greater detail below, bandwidth limitations and bottlenecks within one or more of these network segments triggers video and/or audio bit rate adjustments.

FIG. 12 is a block diagram of an exemplary implementation of content player 1020 of FIG. 10. Content player 1020 generally represents any type or form of computing device capable of reading computer-executable instructions. Content player 1020 includes, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 12, in addition to processor 1022 and memory 1024, content player 1020 includes a communication infrastructure 1202 and a communication interface 1222 coupled to a network connection 1224. Content player 1020 also includes a graphics interface 1226 coupled to a graphics device 1228, an input interface 1234 coupled to an input device 1236, and a storage interface 1238 coupled to a storage device 1240.

Communication infrastructure 1202 generally represents any type or form of infrastructure capable of facilitating communication between one or more components of a computing device. Examples of communication infrastructure 1202 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 1024 generally represents any type or form of volatile or non-volatile storage device or medium capable of storing data and/or other computer-readable instructions. In some examples, memory 1024 stores and/or loads an operating system 1208 for execution by processor 1022. In one example, operating system 1208 includes and/or represents software that manages computer hardware and software resources and/or provides common services to computer programs and/or applications on content player 1020.

Operating system 1208 performs various system management functions, such as managing hardware components (e.g., graphics interface 1226, audio interface 1230, input interface 1234, and/or storage interface 1238). Operating system 1208 also provides process and memory management models for playback application 1210. The modules of playback application 1210 includes, for example, a content buffer 1212, an audio decoder 1218, and a video decoder 1220.

Playback application 1210 is configured to retrieve digital content via communication interface 1222 and play the digital content through graphics interface 1226. Graphics interface 1226 is configured to transmit a rendered video signal to graphics device 1228. In normal operation, playback application 1210 receives a request from a user to play a specific title or specific content. Playback application 1210 then identifies one or more encoded video and audio streams associated with the requested title. After playback application 1210 has located the encoded streams associated with the requested title, playback application 1210 downloads sequence header indices associated with each encoded stream associated with the requested title from distribution infrastructure 1010. A sequence header index associated with encoded content includes information related to the encoded sequence of data included in the encoded content.

In one embodiment, playback application 1210 begins downloading the content associated with the requested title by downloading sequence data encoded to the lowest audio and/or video playback bitrates to minimize startup time for playback. The requested digital content file is then downloaded into content buffer 1212, which is configured to serve as a first-in, first-out queue. In one embodiment, each unit of downloaded data includes a unit of video data or a unit of audio data. As units of video data associated with the requested digital content file are downloaded to the content player 1020, the units of video data are pushed into the content buffer 1212. Similarly, as units of audio data associated with the requested digital content file are downloaded to the content player 1020, the units of audio data are pushed into the content buffer 1212. In one embodiment, the units of video data are stored in video buffer 1216 within content buffer 1212 and the units of audio data are stored in audio buffer 1214 of content buffer 1212.

A video decoder 1220 reads units of video data from video buffer 1216 and outputs the units of video data in a sequence of video frames corresponding in duration to the fixed span of playback time. Reading a unit of video data from video buffer 1216 effectively de-queues the unit of video data from video buffer 1216. The sequence of video frames is then rendered by graphics interface 1226 and transmitted to graphics device 1228 to be displayed to a user.

An audio decoder 1218 reads units of audio data from audio buffer 1214 and outputs the units of audio data as a sequence of audio samples, generally synchronized in time with a sequence of decoded video frames. In one embodiment, the sequence of audio samples is transmitted to audio interface 1230, which converts the sequence of audio samples into an electrical audio signal. The electrical audio signal is then transmitted to a speaker of audio device 1232, which, in response, generates an acoustic output.

In situations where the bandwidth of distribution infrastructure 1010 is limited and/or variable, playback application 1210 downloads and buffers consecutive portions of video data and/or audio data from video encodings with different bit rates based on a variety of factors (e.g., scene complexity, audio complexity, network bandwidth, device capabilities, etc.). In some embodiments, video playback quality is prioritized over audio playback quality. Audio playback and video playback quality are also balanced with each other, and in some embodiments audio playback quality is prioritized over video playback quality.

Graphics interface 1226 is configured to generate frames of video data and transmit the frames of video data to graphics device 1228. In one embodiment, graphics interface 1226 is included as part of an integrated circuit, along with processor 1022. Alternatively, graphics interface 1226 is configured as a hardware accelerator that is distinct from (i.e., is not integrated within) a chipset that includes processor 1022.

Graphics interface 1226 generally represents any type or form of device configured to forward images for display on graphics device 1228. For example, graphics device 1228 is fabricated using liquid crystal display (LCD) technology, cathode-ray technology, and light-emitting diode (LED) display technology (either organic or inorganic). In some embodiments, graphics device 1228 also includes a virtual reality display and/or an augmented reality display. Graphics device 1228 includes any technically feasible means for generating an image for display. In other words, graphics device 1228 generally represents any type or form of device capable of visually displaying information forwarded by graphics interface 1226.

As illustrated in FIG. 12, content player 1020 also includes at least one input device 1236 coupled to communication infrastructure 1202 via input interface 1234. Input device 1236 generally represents any type or form of computing device capable of providing input, either computer or human generated, to content player 1020. Examples of input device 1236 include, without limitation, a keyboard, a pointing device, a speech recognition device, a touch screen, a wearable device (e.g., a glove, a watch, etc.), a controller, variations or combinations of one or more of the same, and/or any other type or form of electronic input mechanism.

Content player 1020 also includes a storage device 1240 coupled to communication infrastructure 1202 via a storage interface 1238. Storage device 1240 generally represents any type or form of storage device or medium capable of storing data and/or other computer-readable instructions. For example, storage device 1240 is a magnetic disk drive, a solid-state drive, an optical disk drive, a flash drive, or the like. Storage interface 1238 generally represents any type or form of interface or device for transferring data between storage device 1240 and other components of content player 1020.

EXAMPLE EMBODIMENTS

Example 1: A computer-implemented method comprising: accessing a video frame that includes a plurality of pixels, generating a spatial mask that identifies one or more pixels whose likelihood of causing banding within the video frame meets at least a minimum threshold likelihood, computing a local distribution for a region of the video frame that includes at least the identified pixels that were identified by the spatial mask to detect one or more bands in the video frame, determining that the detected bands in the video frame are at least a minimum threshold size, and applying dithering to those detected bands in the video frame that were determined to meet the minimum threshold size.

Example 2. The computer-implemented method of claim 1, further comprising outputting the dithered video frame to an electronic display.

Example 3. The computer-implemented method of claim 2, wherein the video frame is part of a video feed that is streamed to the electronic display.

Example 4. The computer-implemented method of claim 1, wherein generating the spatial mask including computing a zero derivative for at least one of the one or more pixels in the video frame.

Example 5. The computer-implemented method of claim 4, wherein the spatial mask is generated for a block of pixels that includes at least a minimum number of adjacent pixels.

Example 6. The computer-implemented method of claim 5, wherein generating the spatial mask includes, for each block of pixels, determining a number of zero derivative values in the region around the block of pixels.

Example 7. The computer-implemented method of claim 6, wherein generating the spatial mask includes assigning the block of pixels to the spatial mask if the determined number of zero derivative values in the region is above a threshold value.

Example 8. The computer-implemented method of claim 1, wherein computing the local distribution comprises identifying two or more bands within the region.

Example 9. The computer-implemented method of claim 1, wherein computing the local distribution comprises identifying one or more local statistics for the region around a specified block of pixels.

Example 10. The computer-implemented method of claim 9, wherein the one or more local statistics for the region comprise p_values for the pixels in the block of pixels.

Example 11. The computer-implemented method of claim 9, wherein identifying the local statistics for the region comprises identifying a largest band and a second largest band.

Example 12. The computer-implemented method of claim 1, wherein the region comprises a specified size, and wherein the size depends on a resolution of a display to which the video frame is to be sent.

Example 13. A system comprising at least one physical processor; and physical memory comprising computer-executable instructions that, when executed by the physical processor, cause the physical processor to: access a video frame that includes a plurality of pixels, generate a spatial mask that identifies one or more pixels whose likelihood of causing banding within the video frame meets at least a minimum threshold likelihood, compute a local distribution for a region of the video frame that includes at least the identified pixels that were identified by the spatial mask to detect one or more bands in the video frame, determine that the detected bands in the video frame are at least a minimum threshold size, and apply dithering to those detected bands in the video frame that were determined to meet the minimum threshold size.

Example 14. The system of claim 13, wherein applying dithering to the detected bands in the video frame includes applying dithering to a block of pixels in the video frame.

Example 15. The system of claim 13, wherein applying dithering to the detected bands in the video frame includes creating a pseudorandom number to generate noise used in the dithering.

Example 16. The system of claim 15, wherein creating the pseudorandom number for noise generation includes indexing a random vector and multiplying by a random number based on a selected pixel value.

Example 17. The system of claim 13, wherein pixel values are updated during dithering according to a calculated probability value.

Example 11. The system of claim 17, wherein the probability value is calculated as part of computing the local distribution.

Example 19. The system of claim 13, wherein the region comprises a specified size, and wherein the size depends on a resolution of a display to which the video frame is to be sent.

Example 20. A non-transitory computer-readable medium comprising one or more computer-executable instructions that, when executed by at least one processor of a computing device, cause the computing device to: access a video frame that includes a plurality of pixels, generate a spatial mask that identifies one or more pixels whose likelihood of causing banding within the video frame meets at least a minimum threshold likelihood, compute a local distribution for a region of the video frame that includes at least the identified pixels that were identified by the spatial mask to detect one or more bands in the video frame, determine that the detected bands in the video frame are at least a minimum threshold size, and apply dithering to those detected bands in the video frame that were determined to meet the minimum threshold size.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
accessing a video frame that includes a plurality of pixels;
generating a spatial mask that identifies one or more pixels whose likelihood of causing banding within the video frame meets at least a minimum threshold likelihood based at least in part on whether the one or more pixels have zero derivatives;
computing a local distribution for a region of the video frame that includes at least the identified pixels that were identified by the spatial mask to detect one or more bands in the video frame;
determining that the detected bands in the video frame are at least a minimum threshold size; and
applying dithering to those detected bands in the video frame that were determined to meet the minimum threshold size.

2. The computer-implemented method of claim 1, further comprising outputting the dithered video frame to an electronic display.

3. The computer-implemented method of claim 2, wherein the video frame is part of a video feed that is streamed to the electronic display.

4. The computer-implemented method of claim 1, wherein generating the spatial mask including computing a zero derivative for at least one of the one or more pixels in the video frame.

5. The computer-implemented method of claim 4, wherein the spatial mask is generated for a block of pixels that includes at least a minimum number of adjacent pixels.

6. The computer-implemented method of claim 5, wherein generating the spatial mask includes, for each block of pixels, determining a number of zero derivative values in the region around the block of pixels.

7. The computer-implemented method of claim 6, wherein generating the spatial mask includes assigning the block of pixels to the spatial mask if the determined number of zero derivative values in the region is above a threshold value.

8. The computer-implemented method of claim 1, wherein computing the local distribution comprises identifying two or more bands within the region.

9. The computer-implemented method of claim 1, wherein computing the local distribution comprises identifying one or more local statistics for the region around a specified block of pixels.

10. The computer-implemented method of claim 9, wherein the one or more local statistics for the region comprise p_values for the pixels in the block of pixels.

11. The computer-implemented method of claim 9, wherein identifying the local statistics for the region comprises identifying a largest band and a second largest band.

12. The computer-implemented method of claim 1, wherein the region comprises a specified size, and wherein the size depends on a resolution of a display to which the video frame is to be sent.

13. A system comprising:
at least one physical processor; and
physical memory comprising computer-executable instructions that, when executed by the physical processor, cause the physical processor to:
access a video frame that includes a plurality of pixels;
generate a spatial mask that identifies one or more pixels whose likelihood of causing banding within the video frame meets at least a minimum threshold likelihood based at least in part on whether the one or more pixels have zero derivatives;
compute a local distribution for a region of the video frame that includes at least the identified pixels that were identified by the spatial mask to detect one or more bands in the video frame;

determine that the detected bands in the video frame are at least a minimum threshold size; and apply dithering to those detected bands in the video frame that were determined to meet the minimum threshold size.

14. The system of claim 13, wherein applying dithering to the detected bands in the video frame includes applying dithering to a block of pixels in the video frame.

15. The system of claim 13, wherein applying dithering to the detected bands in the video frame includes creating a pseudorandom number to generate noise used in the dithering.

16. The system of claim 15, wherein creating the pseudorandom number for noise generation includes indexing a random vector and multiplying by a random number based on a selected pixel value.

17. The system of claim 13, wherein pixel values are updated during dithering according to a calculated probability value.

18. The system of claim 17, wherein the probability value is calculated as part of computing the local distribution.

19. The system of claim 13, wherein the region comprises a specified size, and wherein the size depends on a resolution of a display to which the video frame is to be sent.

20. A non-transitory computer-readable medium comprising one or more computer-executable instructions that, when executed by at least one processor of a computing device, cause the computing device to:

access a video frame that includes a plurality of pixels;

generate a spatial mask that identifies one or more pixels whose likelihood of causing banding within the video frame meets at least a minimum threshold likelihood based at least in part on whether the one or more pixels have zero derivatives;

compute a local distribution for a region of the video frame that includes at least the identified pixels that were identified by the spatial mask to detect one or more bands in the video frame;

determine that the detected bands in the video frame are at least a minimum threshold size; and apply dithering to those detected bands in the video frame that were determined to meet the minimum threshold size.

\* \* \* \* \*